(12) United States Patent
Sahli et al.

(10) Patent No.: US 9,980,610 B2
(45) Date of Patent: May 29, 2018

(54) GRINDER

(71) Applicant: JURA Elektroapparate AG, Niederbuchsiten (CH)

(72) Inventors: Georg Sahli, Ersigen (CH); Stephan Probst, Subingen (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 1164 days.

(21) Appl. No.: 14/162,148

(22) Filed: Jan. 23, 2014

(65) Prior Publication Data

US 2014/0224910 A1    Aug. 14, 2014

(30) Foreign Application Priority Data

Feb. 12, 2013    (EP) ..................................... 13405031

(51) Int. Cl.
*A47J 42/40* (2006.01)
*A47J 42/06* (2006.01)
*A47J 42/10* (2006.01)

(52) U.S. Cl.
CPC ............... *A47J 42/40* (2013.01); *A47J 42/06* (2013.01); *A47J 42/10* (2013.01)

(58) Field of Classification Search
CPC .. A47J 42/40; A47J 42/10; A47J 42/06; A47J 31/42; A47J 42/50; A47J 42/38; A47J 31/404
USPC .................. 241/101.2, 222, 101.5, 100, 162
See application file for complete search history.

(56) References Cited

U.S. PATENT DOCUMENTS

| | | | | |
|---|---|---|---|---|
| 2,181,000 A | * | 11/1939 | Shively ..................... | F25C 5/12 241/100 |
| 3,938,745 A | * | 2/1976 | Gladwin ............. | B02C 19/0087 241/100 |
| 4,502,643 A | * | 3/1985 | Burggrabe ................ | B02C 7/13 241/257.1 |
| 5,518,190 A | | 5/1996 | Aebi et al. | |

(Continued)

FOREIGN PATENT DOCUMENTS

| | | |
|---|---|---|
| DE | 44 18 139 C1 | 2/1995 |
| EP | 1 964 498 A1 | 9/2008 |
| EP | 2 050 377 A1 | 4/2009 |

OTHER PUBLICATIONS

Search Report for European Application No. 13405031.9; dated Apr. 17, 2013.

*Primary Examiner* — Anthony Stashick
*Assistant Examiner* — Onekki Jolly
(74) *Attorney, Agent, or Firm* — Alston & Bird LLP

(57) ABSTRACT

A new grinder is described which is used to grind coffee beans, with a first grinding element and a second grinding element, wherein the two grinding elements are rotatable relative to one another, in such a way that coffee beans are ground by the grinding elements into a coffee powder, and with an entrainer wheel rotatable with the first grinding element, said entrainer wheel being used to convey, on its edge region, the ground coffee powder out of the grinding elements via an exit channel. The edge region of the entrainer wheel is constituted tapered towards the grinding elements with a concave profile, in such a way that an inner high edge (Ri) and an outer low edge (Ra) are formed, and the entrainer wheel comprises a plurality of entrainer vanes distributed in the edge region over the periphery.

20 Claims, 5 Drawing Sheets

(56) References Cited

U.S. PATENT DOCUMENTS

| | | | |
|---|---|---|---|
| 5,845,857 A * | 12/1998 | Haber | A47J 42/40 241/100 |
| 2005/0279219 A1* | 12/2005 | Turi | A47J 31/42 99/286 |
| 2008/0216663 A1* | 9/2008 | Williamson | A47J 31/467 99/279 |
| 2009/0134256 A1* | 5/2009 | Rice | A47J 42/04 241/169.1 |
| 2009/0166455 A1* | 7/2009 | Pai | A47J 42/04 241/93 |
| 2010/0037778 A1* | 2/2010 | Remo | A47J 31/42 99/286 |
| 2011/0256273 A1* | 10/2011 | de Graaff | A47J 31/42 426/112 |
| 2012/0121780 A1* | 5/2012 | Lai | A47J 31/3623 426/433 |
| 2012/0240777 A1* | 9/2012 | Righetti | A47J 31/42 99/280 |
| 2013/0101717 A1* | 4/2013 | de Graaff | A47J 31/42 426/433 |

\* cited by examiner

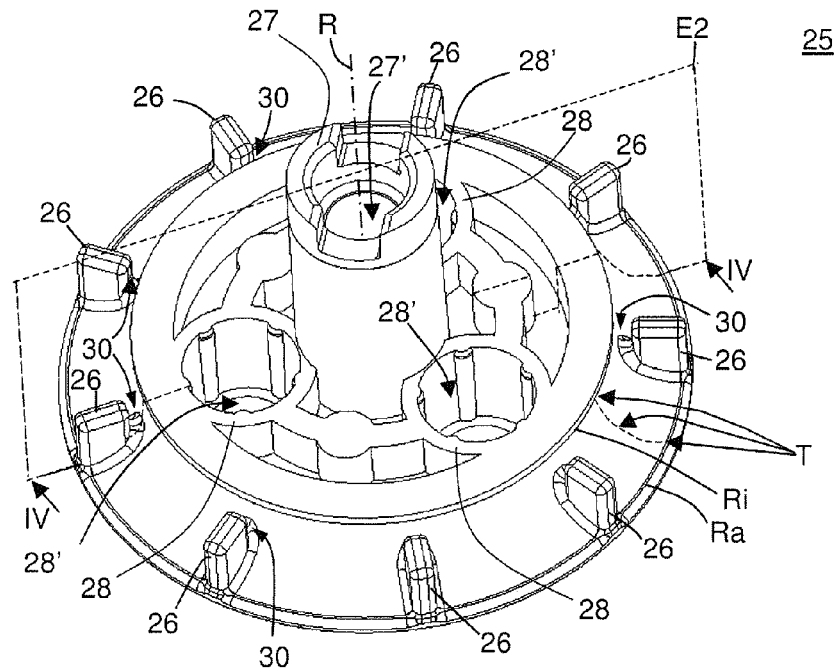
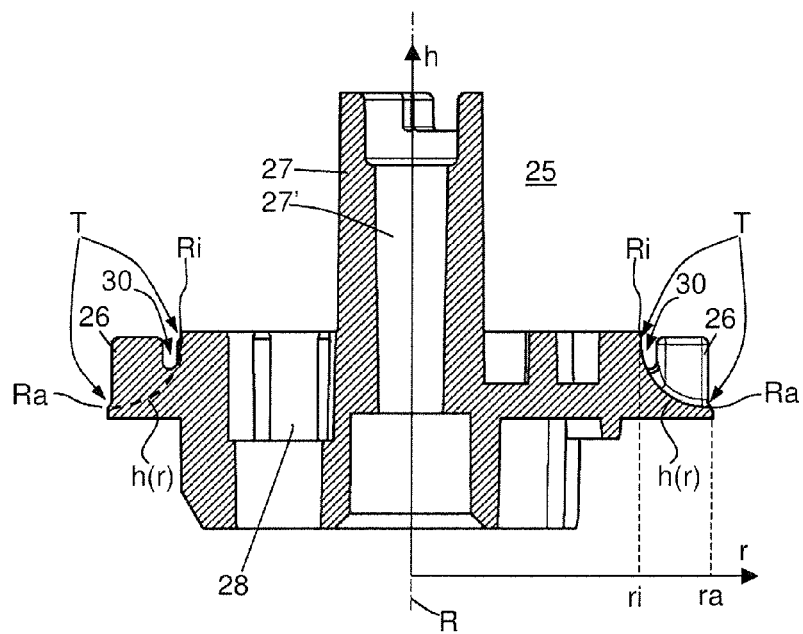
Fig. 3
Fig. 4

GRINDER

FIELD OF THE INVENTION

The invention relates to a grinder which is used to grind coffee beans.

Such a grinder is usually provided in combination with an automatic coffee machine, but can also be used alone.

BACKGROUND

A grinder according to the known prior art usually comprises:
- a grinding arrangement, which is used to grind coffee beans and comprises for this purpose a first grinding element and a second grinding element, wherein the first grinding element can be rotated around a rotational axis relative to the second grinding element in such a way that coffee beans are brought between the two grinding elements and ground into a coffee powder;
- a rotatably mounted entrainer wheel which is mounted rotatably beneath the grinding arrangement and is used for the onward transport of the coffee powder ground by the grinding arrangement;
- an exit channel, via which the ground coffee powder can leave the grinder, wherein the powder is conveyed to the exit channel by means of the entrainer wheel.

There are various types of grinding arrangements which differ in respect of the shape and arrangement of the grinding elements, e.g. conical grinders, disc grinders, etc.

Various forms of entrainer wheels are known. An entrainer wheel can comprise, on the upper side, a region extending around the rotational axis of the entrainer wheel (hereinafter "transport region"), onto which the coffee powder ground by the grinding arrangement can fall. In order that the coffee powder ground by the grinding arrangement can fall onto the transport region of the entrainer wheel, the entrainer wheel has to be suitably disposed relative to the grinding arrangement.

For example, grinders with an entrainer wheel are known, which are constituted conically (see EP-A-1964498, FIG. 1). In DE-A-4418139, an entrainer wheel (also referred to as a "delivery plate") is shown, which is provided at its outer edge with so-called upwardly directed air vanes (see FIGS. 3 and 4). The transport region of this entrainer wheel is constituted very slightly conical, i.e. flat falling away radially outwards in a linear manner. Through rotation of the entrainer wheel, coffee powder located on the transport region is on the one hand carried along around the rotational axis of the entrainer wheel and on the other hand moves radially outwards due to a centrifugal force. Since the transport region falls away slightly in a linear manner, the movement directed radially outwards is additionally assisted.

Known entrainer wheels can comprise a plurality of entrainer vanes, which are disposed on the upper side of the entrainer wheel in the transport region and extend radially with respect to the rotational axis. When the entrainer wheel is rotated, these entrainer vanes carry ground coffee powder ahead of them in the rotational direction, i.e. along a path around the rotational axis.

There are known from DE-A-441813 entrainer vanes ("entrainer vanes 21" according to FIG. 3), which are disposed at the outer edge of the entrainer wheel (9) and extend over a relatively short distance (compared to the width of the transport region) of the entrainer wheel. A drawback is that the coffee powder is not conveyed very efficiently around the rotational axis by means of these entrainer vanes, but rather swirls up. Powder falling on the entrainer wheel remains in the transport region during a number of revolutions of the entrainer wheel before it reaches the exit channel, so that a small delivery capacity results.

In EP-A-1964498, the entrainer vanes ("ribs 261" according to FIG. 1 and section [0013]) extend radially with respect to the rotational axis of the entrainer wheel and their height diminishes to zero in the direction of the rotational axis. The drawback thus arises that the ground powder can slide onto the upper side of the entrainer vane, which leads to clogging-up, so that a rotation of the entrainer wheel is impeded or the entrainer wheel becomes blocked. Stale coffee powder can accumulate on the entrainer vanes and mix with freshly ground powder, which adversely affects the taste of the brewed coffee.

SUMMARY OF THE INVENTION

The problem underlying the present invention is to avoid the aforementioned drawbacks, and to provide a grinder with which the ground coffee powder is conveyed rapidly and completely to the exit channel.

This problem is solved by a grinder with the features of claim 1.

The grinder according to the invention, which is used to grind coffee beans, is provided with a first grinding element and a second grinding element, wherein the two grinding elements are rotatable relative to one another, in such a way that coffee beans are ground by the grinding elements into a coffee powder. Furthermore, an entrainer wheel rotatable with the first grinding element is provided, said entrainer wheel being used to convey, on its edge region, the ground coffee powder out of the grinder via an exit channel. The edge region of the entrainer wheel is constituted tapered towards the grinding elements with a concave profile, in such a way that an inner high edge and an outer low edge are formed, and the entrainer wheel comprises a plurality of entrainer vanes distributed in the edge region over the periphery.

The grinder according to the invention has the great advantage that it is very compact and has an improved delivery capacity compared to conventional grinders. The effect of the special embodiment of the entrainer wheel with the entrainer vanes is that ground coffee powder is conveyed very rapidly out of the grinding device into the exit channel. Furthermore, the residual quantity of coffee powder—i.e. the ground coffee powder remaining on the entrainer wheel and in the exit channel after completion of the grinding process—is much smaller.

Further advantages emerge from the following description and the sub-claims.

BRIEF SUMMARY OF THE DRAWINGS

Further details of the invention and in particular exemplary embodiments of the device according to the invention are explained below with the aid of the appended drawings. In the figures:

FIG. 3 shows a perspective view of the entrainer wheel according to FIG. 1;

FIG. 4 shows the entrainer wheel according to FIG. 3 in a cross-section through plane E2 according to FIG. 3;

DETAILED DESCRIPTION

The same reference numbers are used in each case for the same elements in the figures, unless indicated otherwise.

Figure 1:
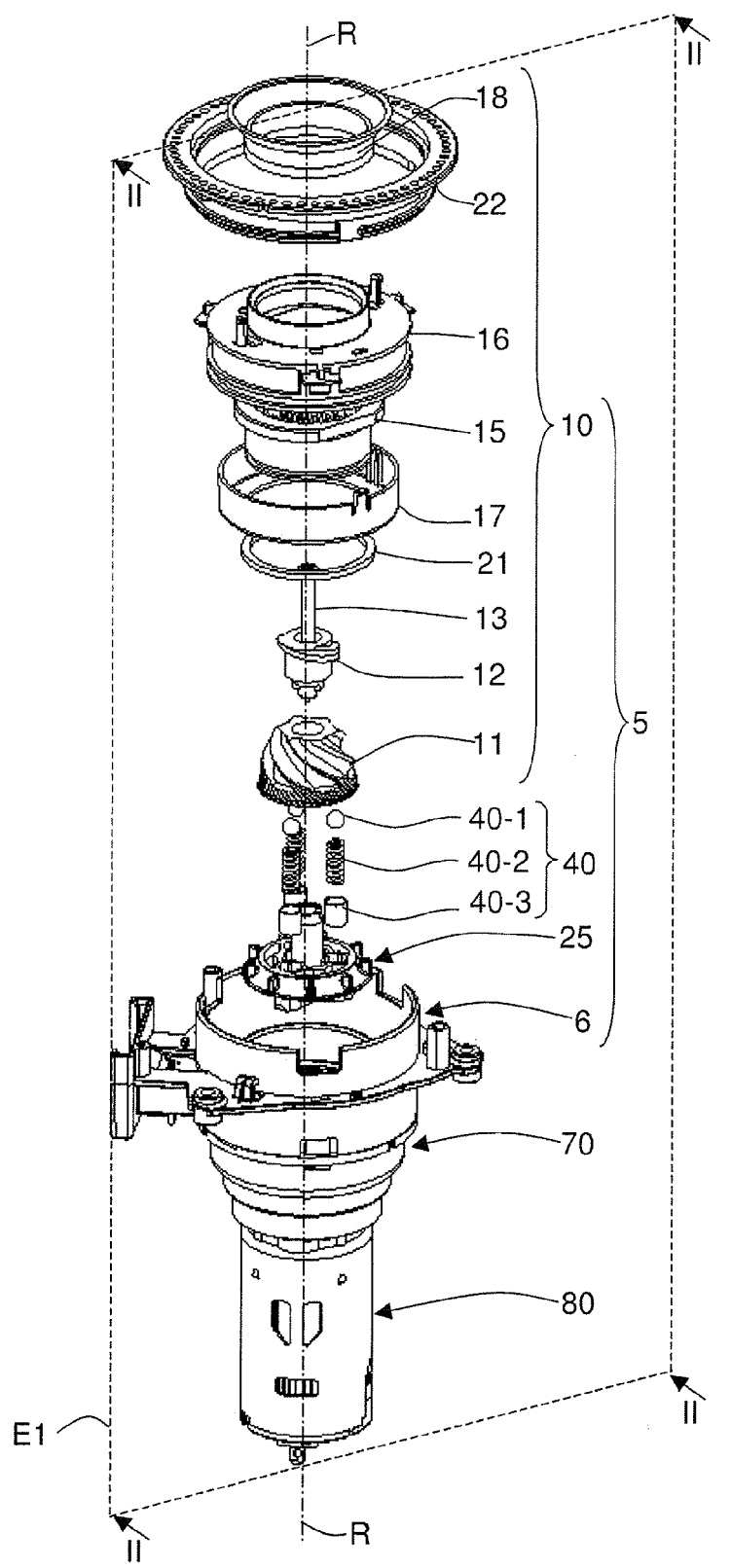
FIG. 1 shows an exploded representation of a grinder with a grinding arrangement and an entrainer wheel.

FIG. 1 shows (in perspective and in an exploded representation) a grinder 1 for grinding coffee beans, which comprises a grinding device 5 with a gear unit 70 and a drive motor 80. Grinding device 5 is split up into grinding arrangement 10, a friction clutch 40 and an entrainer wheel 25, wherein these parts are enclosed by a housing 6. In the present example, grinder 1 is constituted as a "conical grinder". Accordingly, grinding arrangement 10 comprises a first grinding element 11 (a grinding cone with helical blades in the present example) and a second grinding element 15 (a grinding ring in the present example). First grinding element 11 is disposed rotatably relative to second grinding element 15. A rotatable conveying element 12 (constituted as a worm in the present example), a fastening screw 13, a sealing ring 21, a fastening ring 17 for second grinding element 15, a support 16, an adjusting ring 22 and a coupling element 18 are provided, in the order from grinding element 11 upwards. Fitted below first grinding element 11 is a friction clutch 40, which comprises three balls 40-1, three compression springs 40-2 and three sleeves 40-3. In the event of first grinding element 11 and entrainer wheel 25 jamming, the friction clutch ensures in a manner known per se that entrainer wheel 25 can be rotated relative to first grinding element 11 by means of drive motor 80, so that grinding arrangement 10 does not seize up and drive motor 80 does not therefore overheat.

Figure 2:
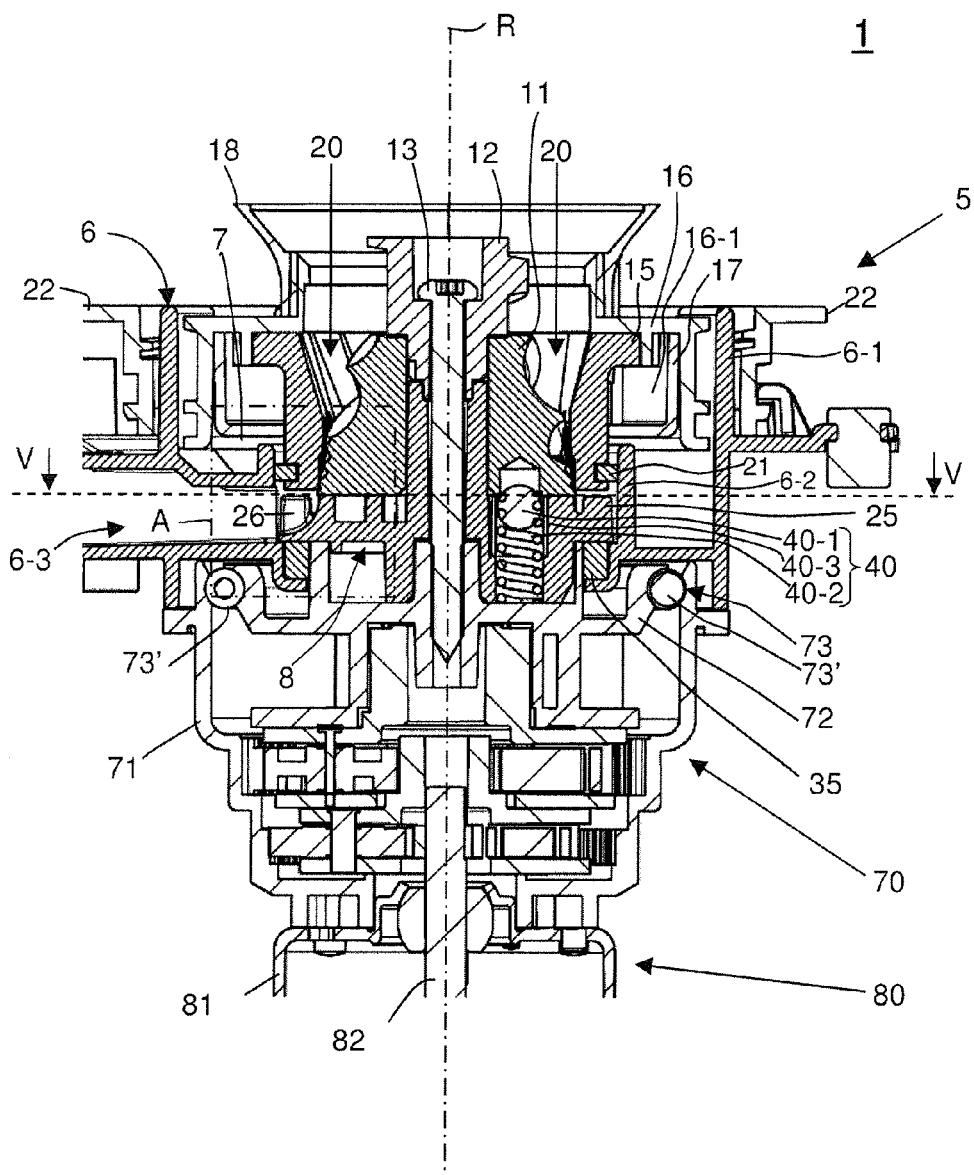
FIG. 2 shows the grinder according to FIG. 1 in a cross-section through plane E1 according to FIG. 1.

FIG. 2 shows a cross-section through plane II-II in FIG. 1. Provided in housing 6 is a first upper chamber 7, which accommodates actual grinding arrangement 10, and a second lower chamber 8, which accommodates entrainer wheel 25 and is used to convey the ground coffee powder onward. Housing 6 comprises a first outer wall 6-1, which bounds first chamber 7, a second wall 6-2, which bounds second chamber 8, an exit channel 6-3 and an exit opening 6-4, from which the ground coffee powder is delivered from grinder 1. Rotatable conveying element (worm) 12 is used to convey the product to be ground or the coffee beans along rotational axis R into entrance gap 20 between first grinding element 11 and second grinding element 15. First grinding element 11, conveying element 12 and entrainer wheel 25 are secured to a drive element 72 of gear unit 70 by means of screw 13. Support 16 comprises snap-on elements 16-1 for holding second grinding element 15.

Fastening ring 17 is fixed on support 16 in order to lock home snap-on elements 16-1, so that second grinding element 15 is held fixedly on support 16. Annular coupling element 18 is made of an elastic material (e.g. plastic) and is seated on support 16 in order to couple a storage container for the product to be ground (not represented) on grinder 1, said storage container being able to be placed on from above. Sealing ring 21 is constituted as a flat ring made of plastic and is clamped between second grinding element 15 and housing 6 in order to prevent ground coffee powder from escaping upwards. Adjusting ring 22 is mounted rotatably around rotational axis R on housing 6, i.e. is coupled mechanically to support 16, so that adjusting ring 22 displaces support 16 with second grinding element 15 upwards or downwards in the direction of rotational axis R, as a result of which the degree of grinding of the coffee is adjusted. Entrainer wheel 25 is used to transport the ground coffee powder and is mounted rotatably around rotational axis R and coupled by coupling 40 to first grinding element 11. A flat seal 35 (usually made of felt) seals the underside of entrainer wheel 25 against housing 6 and thus prevents an escape of ground coffee powder downwards. Gear unit 70 comprises gear housing 71, a drive element 72 which is used to drive first grinding element 11 and entrainer vanes 26, and a roller bearing 73 with balls 73', which guides drive element 72 on gear housing 71. Motor housing 81 and drive shaft 82 of drive motor 80 can partially be seen.

FIGS. 3 and 4 show entrainer wheel 25 with nine essentially cuboid entrainer vanes 26 distributed uniformly around the periphery. FIG. 4 shows a cross-section along plane E2 in the direction of arrows IV. These entrainer vanes 26 are used to convey the ground coffee powder when entrainer wheel 25 rotates around rotational axis R. Each entrainer vane 26 entrains a specific quantity of coffee powder with a rotation of entrainer wheel 25 and pushes said quantity ahead of it in the rotational direction. A sleeve 27 with a central bore 27' is provided on entrainer wheel 25 in order to place entrainer wheel 25 onto a section of drive element 72, said section being constituted complementary with sleeve 27. Sleeve 27 is also used for the passage of fastening screw 13 in order to fasten entrainer wheel 25 to drive element 72. Disposed around sleeve 27 are three circular cylinders 28 with in each case a bore 28', which serves to receive the components of friction clutch 40.

Entrainer wheel 25 comprises a transport region T, which is constituted tapered towards grinding elements 11 and 15 with a concave profile, so that an inner high edge Ri and an outer low edge Ra is formed. Inner edge Ri has a smaller radius ri with respect to rotational axis R, and outer edge Ra has a larger radius ra. The concave profile of entrainer wheel 25 is described by a curve with the formula $h(r)$, which describes the height of transport region T (with respect to a plane normal to rotational axis R) as a function of distance r from rotational axis R in the region between inner edge Ri and outer edge Ra. Provided between inner edge Ri and entrainer vane 26 is a gap 30 in entrainer wheel 25, said gap being aligned with an exit gap 20' for coffee powder constituted in grinding arrangement 10 (see FIG. 6). This gap 30 prevents the coffee powder ground by grinding arrangement 10 (which passes via exit gap 20' onto transport region T of entrainer wheel 25) from falling onto the upper side of entrainer vane 26, so that clogging-up of second chamber 8 with coffee powder is prevented.

Figure 5A:
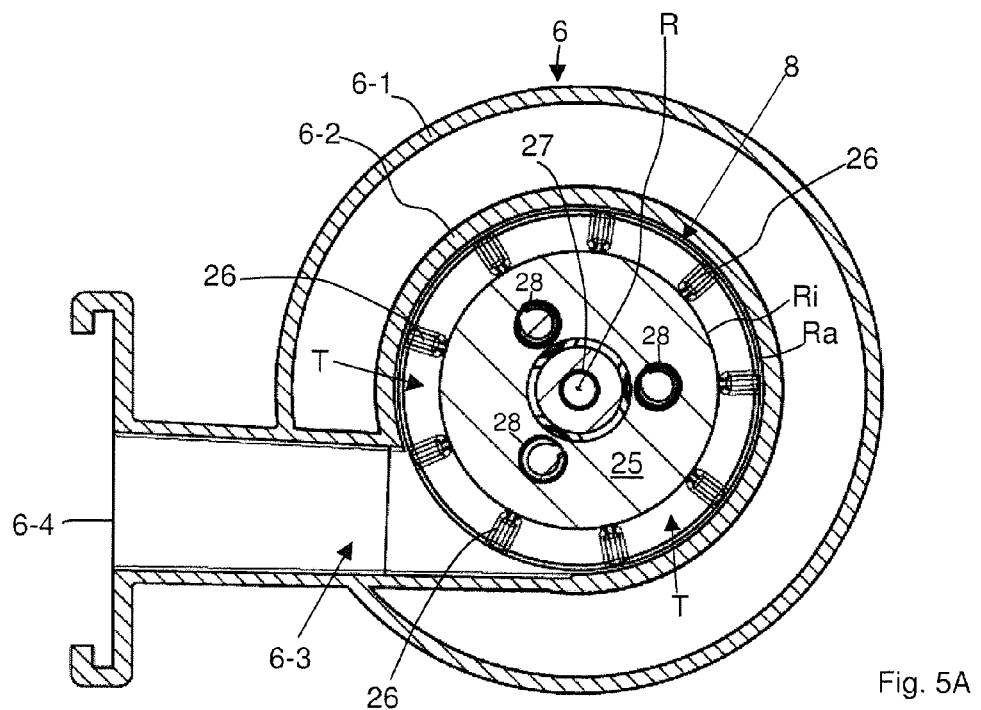
FIG. 5A shows the grinder according to FIG. 2 in a cross-section along section V-V in an empty state (without ground coffee powder)
Figure 5B:
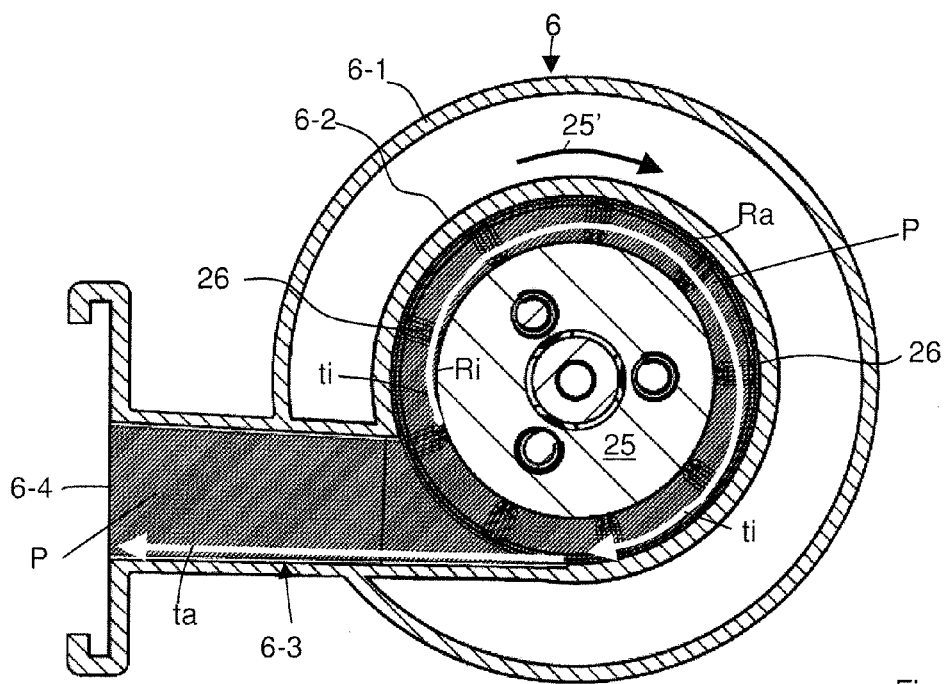
FIG. 5B shows the grinder according to FIG. 2 in a cross-section along section V-V in a filled state (with ground coffee powder)

FIGS. 5A and 5B show a cross-section along line V-V in the direction of arrows V of FIG. 2. FIG. 5A represents entrainer wheel 25 without coffee powder, FIG. 5B with coffee powder P. Arrow 25' shows the rotational direction of entrainer wheel 25. Arrow ti in FIG. 5B describes diagrammatically a transport path for coffee powder in second chamber 8 on transport region T of entrainer wheel 25 after the exit of the coffee powder out of grinding arrangement 10 (out of exit gap 20' according to FIG. 6), starting in the vicinity of inner edge Ri. As arrow ti in FIG. 5B indicates diagrammatically, a displacement of the coffee powder between two entrainer vanes 26 takes place outwards, caused by the concave shape of profile $h(r)$ and by the centrifugal forces which arise due to the rotation of entrainer wheel 25. This thus ensures that the ground coffee powder is conveyed into exit channel 6-3 to exit opening 6-4 after a single revolution of entrainer wheel 25. The cross-section of exit channel 6-3 corresponds approximately to the distance between two entrainer vanes.

Figure 6:
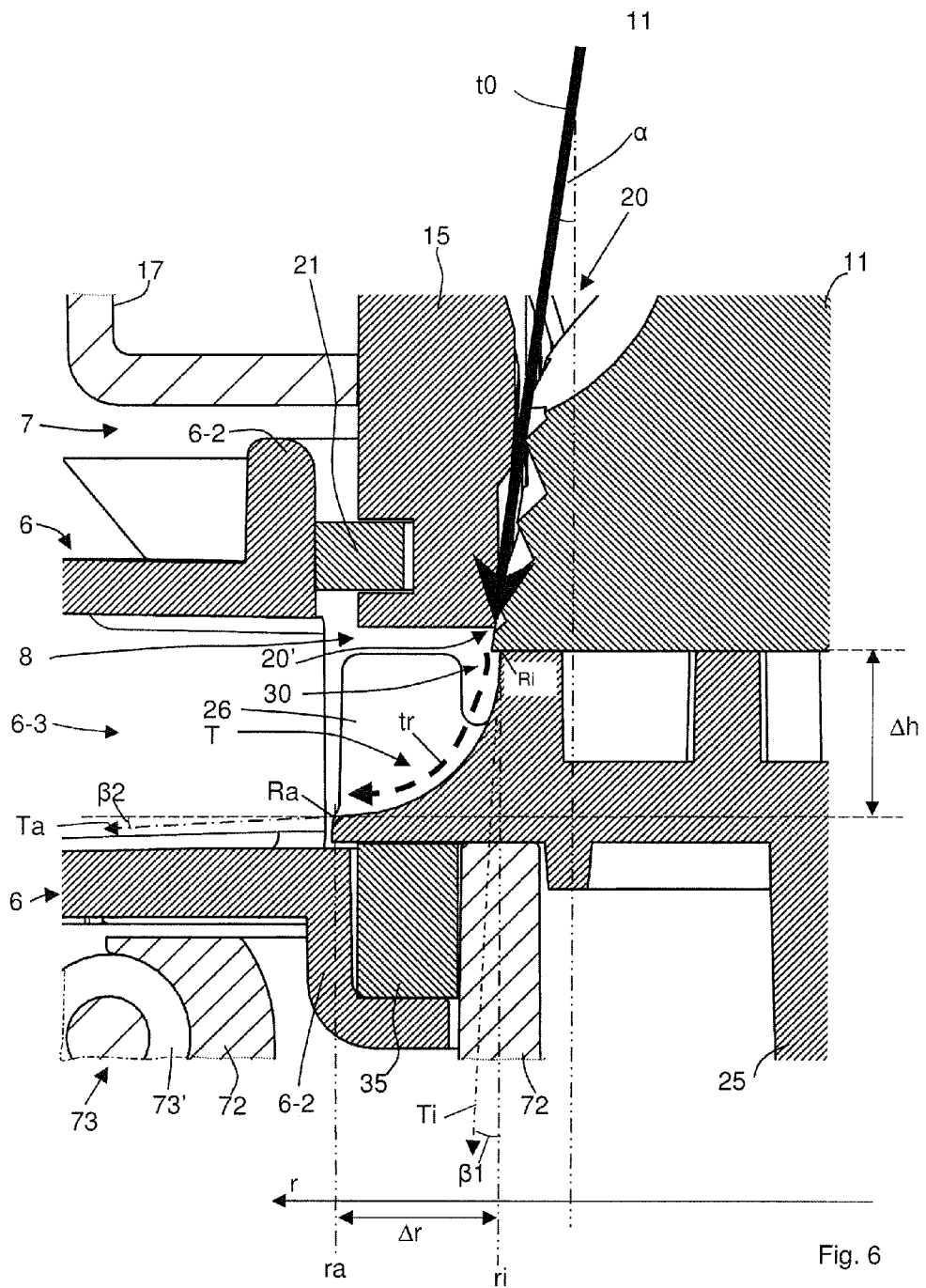
FIG. 6 shows a magnified detail of the representation of the grinder corresponding to rectangle A in FIG. 2.

FIG. 6 shows a magnification of section A indicated with a broken line in FIG. 2. The direction of freshly ground coffee powder in entrance gap 20 between first and second grinding element 11 and 15 is characterised by arrow t0. The direction of the movement of the ground coffee powder emerging from exit gap 20' from high inner edge Ri to low outer edge Ra is shown by arrow tr. The two arrows t0 and tr relate only to the radial components of the movement. As can be seen, arrow tr is curved corresponding to the concave shape of profile h(r). The radial extension (or width) $\Delta r$ of concave profile h(r) is determined by the difference between radius ra of outer edge Ra and radius ri of inner edge Ri. Ti denotes the tangent to curve h(r) at inner edge Ri in the radial direction. It forms an angle $\beta 1$ with the vertical (parallel to rotational axis R). Ta denotes the tangent to curve h(r) at outer edge Ra in the radial direction, which forms an angle $\beta 2$ with the horizontal (normal to rotational axis R). Angle of incidence $\alpha$ of the ground coffee powder at exit gap 20' is determined by the cone angle of first grinding element 11 and lies between 0 and 45°, preferably at 5°. Angle $\beta 1$ lies between 0 and $\alpha$. On account of the concave shape of curve h(r), $\beta 1 <$ arc $\tan(\Delta r/\Delta h)$ applies to angle $\beta 1$. Angle $\beta 2$ lies between 0 and arc $\tan(\Delta h/\Delta r)$.

Otherwise, angle $\beta 2$ can be adapted to the direction of exit channel 6-3, i.e. tangent Ta can for example be orientated parallel to a longitudinal axis of exit channel 6-3. In the present example, exit channel 6-3 is orientated horizontal. The latter has the advantage that a particularly small overall height of grinder 1 can be achieved, but it has the drawback that coffee powder remains in exit channel 6-3 after the grinding.

Concave profile h(r) as a concavely curved curve has the following important effects:
  a) Transport region T has, at inner edge Ri of the transport region, a greater gradient compared to a linear height profile with identical extensions $\Delta h$ and $\Delta r$. The greater gradient leads to efficient transport of coffee powder in the radial direction outwards, assuming that the coffee powder falls onto transport region T in the vicinity of inner edge Ri. An improvement in the delivery capacity is thus achieved.
  b) In second chamber 8 in which entrainer wheel 25 is disposed, on account of the formation of height profile h(r) as a concavely curved curve, there is a greater volume available for accommodating powder compared to a linear height profile with identical extensions $\Delta h$ and $\Delta r$. Transport region T can therefore accommodate a greater quantity of powder, which leads to an increase in the transport capacity.

Parameters $\Delta h$ and $\Delta r$ and the curvature of curve h(r) are used for an optimisation:
  a) and b) produce an improvement in the delivery capacity (i.e. the quantity of coffee powder that leave to the exit channel per revolution of the entrainer wheel),
  $\Delta h$, $\Delta r$ and the curvature of curve h(r) determine the size of the remaining quantity, which should be as small as possible,
  $\Delta h$, $\Delta r$ and the curvature of curve h(r) are selected such that, for the most part, coffee powder that is produced with a revolution of the first grinding element 11 and falls onto entrainer wheel 25 reaches exit channel 6-3 basically at the latest after a single revolution of entrainer wheel 25.

In the present case, curve h(r) is circular with a radius which corresponds to width $\Delta r$ of transport region T. The curve h(r) can however also be formed hyperbolic or parabolic or can be curved concavely in another way.

With regard to entrainer vanes 26, it is relevant that each entrainer vane 26 extends radially, in such a way that a slit or gap 30 is formed between entrainer vane 26 and inner edge of Ri of the transport region. Gap 30 should be as small as possible in the radial direction, but at least so wide that coffee powder delivered by the grinding arrangement cannot fall onto the upper side of entrainer vanes 26. Clogging-up with coffee powder in chamber 8 and in exit channel 6-3 is thus prevented and it is ensured that coffee powder that is always freshly ground can be transported via transport region T to exit channel 6-3.

On account of the concave shape of curve h(r), on transport region T, the coffee powder is bunched, compressed and transported as a compact line directly into exit channel 6-3. During the operation of grinder 1, such a line of the compressed coffee powder is continuously conveyed out of exit opening 6-4 and made available for further use, e.g. in a brewing unit of an automatic coffee machine (not represented).

With grinder 1, a small residual quantity of approx. 1 to 1.5 grams accumulates in chamber 8 of entrainer wheel 25 (with a suitable selection of $\Delta h$, $\Delta r$ and of the curvature of curve h(r)), so that a high proportion of freshly ground coffee powder is always present, even if coffee powder is to be made available from grinder 1 for a coffee speciality which is brewed from a little amount of coffee powder, for example from approx. 10-12 grams of coffee powder in the case of espresso.

The invention claimed is:

1. A grinder, for use in grinding coffee beans, comprising:
   a first grinding element; and
   a second grinding element, wherein the two grinding elements are rotatable relative to one another, in such a way that coffee beans are ground by the grinding elements into a coffee powder, and
   an entrainer wheel rotatable with the first grinding element, said entrainer wheel being used to convey, on its edge region, the ground coffee powder out of the grinder via an exit channel,
   wherein the edge region of the entrainer wheel is constituted tapered towards the grinding elements with a concave profile (h(r)), in such a way that an inner high edge (Ri) and an outer low edge (Ra) are formed, and the entrainer wheel comprises a plurality of entrainer vanes distributed in the edge region over the periphery.

2. The grinder according to claim 1, wherein the entrainer vanes are orientated radially on the entrainer wheel.

3. The grinder according to claim 1, wherein the entrainer vanes are distributed over the periphery at a regular distance from one another.

4. The grinder according to claim 1, wherein a gap is provided between each entrainer vane and the inner high edge (Ri), in such a way that an exit gap for the ground coffee powder constituted between the first grinding element and the second grinding element emerges into the gap, wherein the gap is used to take over the ground coffee powder directly.

5. The grinder according to claim 1, wherein the entrainer vanes are constituted essentially cuboid.

6. The grinder according to claim 1, wherein the height of the entrainer vanes corresponds to the height of the inner edge (Ri).

7. The grinder according to claim 1, wherein the concave profile (h(r)) is circular in cross-section.

8. The grinder according to claim 7, wherein the circular radius of the concave profile (h(r)) corresponds to the distance between the inner edge (Ri) and the outer edge (Ra).

9. The grinder according to claim 1, wherein the concave profile (h(r)) is hyperbolic in cross-section.

10. The grinder according to claim 1, wherein the exit channel is formed in such a way that its height essentially corresponds to the height of the entrainer wheel and its width essentially corresponds to the distance between two entrainer vanes.

11. The grinder according to claim 2, wherein the entrainer vanes are distributed over the periphery at a regular distance from one another.

12. The grinder according to claim 1, wherein the concave profile (h(r)) is parabolic in cross-section.

13. A grinder, for use in grinding coffee beans, comprising:
- a first grinding element;
- a second grinding element, wherein the two grinding elements are rotatable relative to one another to be configured to grind coffee beans by the grinding elements into a coffee powder; and
- an entrainer wheel rotatable with the first grinding element, said entrainer wheel configured to convey, on its edge region, the ground coffee powder out of the grinder via an exit channel,
- wherein the edge region of the entrainer wheel is tapered towards the grinding elements with a concave profile (h(r)), in such a way that an inner high edge (Ri) and an outer low edge (Ra) are formed, and the entrainer wheel comprises a plurality of entrainer vanes distributed in the edge region over the periphery,
- wherein a gap is provided between each entrainer vane and the inner high edge, in such a way that an exit gap is configured from which the ground coffee powder constituted between the first grinding element and the second grinding element emerges, wherein the gap is configured to take over the ground coffee powder directly, and
- wherein the exit channel is formed in such a way that its height corresponds to the height of the entrainer wheel and its width corresponds to the distance between two entrainer vanes.

14. The grinder according to claim 13, wherein the entrainer vanes are orientated radially on the entrainer wheel.

15. The grinder according to claim 13, wherein the height of the entrainer vanes corresponds to the height of the inner edge (Ri).

16. The grinder according to claim 13, wherein the concave profile (h(r)) is circular in cross-section.

17. The grinder according to claim 16, wherein the circular radius of the concave profile (h(r)) corresponds to the distance between the inner edge (Ri) and the outer edge (Ra).

18. The grinder according to claim 13, wherein the concave profile (h(r)) is hyperbolic in cross-section.

19. A grinder, for use in grinding coffee beans, comprising:
- a first grinding element;
- a second grinding element, wherein the two grinding elements are rotatable relative to one another to be configured to grind coffee beans by the grinding elements into a coffee powder; and
- an entrainer wheel rotatable with the first grinding element, said entrainer wheel configured to convey, on its edge region, the ground coffee powder out of the grinder via an exit channel,
- wherein the edge region of the entrainer wheel is tapered towards the grinding elements with a concave profile (h(r)), in such a way that an inner high edge (Ri) and an outer low edge (Ra) are formed, and the entrainer wheel comprises a plurality of entrainer vanes distributed in the edge region over the periphery,
- wherein the entrainer vanes are orientated radially on the entrainer wheel, and
- wherein the height of the entrainer vanes corresponds to the height of the inner edge (Ri).

20. The grinder according to claim 19, wherein the entrainer vanes are distributed over the periphery at a regular distance from one another.

* * * * *

UNITED STATES PATENT AND TRADEMARK OFFICE
CERTIFICATE OF CORRECTION

PATENT NO. : 9,980,610 B2
APPLICATION NO. : 14/162148
DATED : May 29, 2018
INVENTOR(S) : Sahli et al.

It is certified that error appears in the above-identified patent and that said Letters Patent is hereby corrected as shown below:

In the Claims

Column 6
Line 39, "a first grinding element; and" should read --a first grinding element;--

Signed and Sealed this
Thirtieth Day of October, 2018

Andrei Iancu
*Director of the United States Patent and Trademark Office*